United States Patent [19]  [11]  4,296,008
St. Clair et al.  [45]  Oct. 20, 1981

[54] SEALANT COMPOSITION

[75] Inventors: David J. St. Clair; Earle E. Ewins, Jr., both of Houston, Tex.

[73] Assignee: Shell Oil Company, Houston, Tex.

[21] Appl. No.: 142,311

[22] Filed: Apr. 21, 1980

[51] Int. Cl.³ .......................... C08L 93/00; C08J 3/00
[52] U.S. Cl. .......................... 260/27 BB; 260/29.1 R; 260/29.1 SB; 525/102; 525/105
[58] Field of Search .............. 525/102, 105; 260/29.1 R, 29.1 SB, 27 BB

[56] References Cited

U.S. PATENT DOCUMENTS

| | | | |
|---|---|---|---|
| 3,239,478 | 3/1966 | Harlan | 260/27 |
| 3,772,237 | 11/1973 | Bullman et al. | 525/102 |
| 3,955,036 | 5/1976 | Phieddemann | 525/102 |
| 4,003,843 | 1/1977 | Kempermann et al. | 525/102 |
| 4,101,483 | 7/1978 | Moskal | 260/27 BB |
| 4,101,484 | 7/1978 | Doss | 260/27 BB |
| 4,102,835 | 7/1978 | Freeman et al. | 260/27 BB |
| 4,113,914 | 9/1978 | Doss | 260/27 BB |
| 4,131,709 | 12/1978 | Schunck et al. | 260/27 BB |
| 4,136,071 | 1/1979 | Korpman | 260/27 BB |
| 4,138,378 | 2/1979 | Doss | 260/27 BB |

Primary Examiner—William F. Hamrock
Attorney, Agent, or Firm—Dean F. Vance

[57] ABSTRACT

A sealant composition possessing an excellent balance of properties including good tack, low melt viscosity and a cohesive failure mechanism in the 180° peel test comprises a selectively hydrogenated monoalkenyl arene/conjugated diene block copolymer component having certain block molecular weights, tackifying resin, plasticizers and silane coupling agent.

8 Claims, No Drawings

SEALANT COMPOSITION

BACKGROUND OF THE INVENTION

Various sealant compositions have been disclosed in the prior art. The basic patent in this field is Harlan, U.S. Pat. No. 3,239,478, which shows combinations of styrene-diene block copolymers with tackifying resins and the like to produce a wide spectrum of sealants and adhesives. However, in the past it has not been possible to prepare transparent sealant compositions that meet all the desired characteristics of a good sealant. At present, the market for weatherable, transparent sealants is dominated by 100% solids, chemically curing silicone sealants. While silicone sealants give excellent performance in a wide range of applications, transparent silicone sealants are actually quite turbid and are very expensive. Sealants made with non-hydrogenated styrene-diene block copolymers, such as those disclosed in U.S. Pat. Nos. 4,101,482, 4,101,483 and 4,101,484 lack the necessary oxidative and UV stability. Sealants based on commercially available hydrogenated styrene-diene block copolymers, such as those disclosed in U.S. Pat. No. 4,113,914, also have certain shortcomings. Sealants based on commercially available selectively hydrogenated styrene-butadiene-styrene block copolymers have good hardness, temperature resistance and UV resistance, but the failure mechanism is adhesive failure, which failure mechanism is not acceptable in sealants. In addition, the melt viscosity is too high for many commercial operations. A novel sealant composition has now been discovered that not only gives better tack and lower melt viscosity (especially in formulations containing no plasticizers), but also results in cohesive as opposed to adhesive failure.

SUMMARY OF THE INVENTION

The present invention broadly comprises a sealant composition possessing excellent tack, excellent holding power, reduced melt viscosity, and good UV and oxidative stability along with cohesive failure mechanism. The sealant comprises:
  (a) 100 parts by weight of a block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A and A' blocks are between about 3,000 and about 7,000 and the monoalkenyl arene content of the multiblock copolymer is between about 7% and about 22% by weight;
  (b) about 50 to about 350 parts by weight of an adhesion-promoting resin compatible with block B;
  (c) about 0 to about 100 parts by weight of a plasticizer; and
  (d) about 0.1 to about 10 parts by weight of a silane coupling agent.

Additional components may be present in the sealant compositions including, among other, antioxidants, fillers, UV stabilizers, end block (A or A') compatible resins and carriers.

DETAILED DESCRIPTION OF THE INVENTION

The term "block copolymer component" comprises the combination of a multiblock copolymer, as hereinafter defined, and an A'B' two block copolymer. The weight ratio of the multiblock copolymer to the A'B' two block copolymer is about 100:0 to about 25:75, preferably about 80:20 to about 40:60.

The multiblock copolymers employed in the present invention may have a variety of geometrical structures, since the invention does not depend on any specific geometrical structure, but rather upon the chemical constitution of each of the polymer blocks. Thus, the structures may be linear, radial or branched so long as each multiblock copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with coupling agents such as mono or dihaloalkanes or -alkenes and divinyl benzenes as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:
polystyrene-polybutadiene-polystyrene (SBS)
polystyrene-polyisoprene-polystyrene (SIS)
poly(alpha-methylstyrene)-polybutadiene-poly(alphamethylstyrene) and
poly(alpha-methylstyrene)-polyisoprene-poly(alphamethylstyrene).

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term monoalkenyl arene will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 65 mol percent of the condensed butadiene units in the butadiene polymer block have 1,2 configuration, as measured by a standard NMR technique. Thus, when such a block is hydrogenated, the resulting product is, or resembles, a regular copolymer block of ethylene and butene-1 (EB). Most preferably, the 1,2 content is about 50%. If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks are very important aspects of the present invention and may vary only within certain limits. In most instances, the monoalkenyl arene blocks will have number average molecular weights in the order of 3,000 to 7,000 preferably about 5,000 while the conjugated diene blocks either before or after hydrogenation will have average molecular weights in the order of 30,000 to 500,000, preferably 40,000 to 500,000. The total average molecular weight of the multiblock copolymer is typically in the order of 35,000 to about 500,000, preferably from about 45,000 to about 400,000, and depends upon geometry of the polymer. These molecular weights are most accurately determined by tritium counting methods or osmotic pressure measurements. The diene block molecular weight is effectively set by the limitations on monoalkenyl arene block molecular weight and the weight percentage of monoalkenyl arene along with the geometry of the copolymer.

The proportion of the monoalkenyl arene blocks should be between about 7 and 22% by weight of the multiblock copolymer, preferably between about 10 and 18% by weight.

The chemical composition and molecular weight ranges of the A' and B' blocks of the A'B' two block copolymer are the same as the A and B blocks of the multiblock copolymer. The A'B' two block copolymer may be prepared in a separate synthesis process or may be prepared along with the multiblock copolymer by controlling coupling efficiency. The control of coupling efficiency is disclosed in U.S. Pat. No. 4,096,203. The A'B' two block copolymer is useful in reducing the overall viscosity of the adhesive composition along with improving the tack.

The block copolymer component by itself lacks the required adhesion. Therefore, it is necessary to add an adhesion promoting or tackifying resin that is compatible with the elastomeric conjugated diene block. A common tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl-2-butene and about 10% dimer. See U.S. Pat. No. 3,577,398. Other tackifying resins of the same general type may be employed in which the resinous copolymer comprises 20-80 weight percent of piperylene and 80-20 weight percent of 2-methyl-2-butene. The resins normally have softening points (ring and ball) between about 80° C. and about 115° C. Other adhesion promoting resins which are also useful in the compositions of this invention include hydrogenated resins, esters of rosins, polyterpenes, terpenephenol resins, and polymerized mixed olefins. For best UV resistance, it is preferred that the tackifying resin be a saturated resin, e.g., a hydrogenated dicyclopentadiene resin such as Escorez 5380 resin made by EXXON or a hydrogenated polystyrene or polyalphamethylstyrene resin such as XPS 657 resin made by Hercules.

The amount of adhesion promoting resin employed varies from about 50 to about 350 parts by weight per hundred parts rubber (phr), preferably between about 80 to about 250 phr.

The adhesive compositions of the instant invention also may contain plasticizers such as rubber extending or compounding oils or liquid resins. These rubber compounding oils are well-known in the art and include both high saturates content and high aromatics content oils. Preferred plasticizers are highly saturated oils. The amount of rubber compounding oil employed varies from 0 to about 100 phr, preferably about 10 to about 60 phr.

Optionally, an arene-block-compatible resin may be employed. Compatibility is judged by the method disclosed in U.S. Pat. No. 3,917,607. Normally, the resin should have a softening point above about 100° C., as determined by ASTM method E 28, using a ring and ball apparatus. Mixtures of arene-block-compatible resins having high and low softening points may also be used. Useful resins include coumaroneindene resins, polystyrene resins, vinyl toluene-alphamethylstyrene copolymers, and polyindene resins. Much preferred is a coumaroneindene resin. The amount of arene-block-compatible resin varies from 0 to about 200 phr.

An essential component of the present invention is a silane coupling agent. These silanes are very important in improving the water resistance of the sealant composition. In general, these silane coupling agents are ambifunctional molecules with the unique ability to improve the bond between organic polymers and many mineral surfaces; and to retain composite properties after prolonged exposure to moisture.

Chemically, silane coupling agents are hybrid materials that possess the dual functionality of an organic reactive group at one end of the molecule and the inorganic silanol functionality on the opposite end. Generically, all silane coupling agents can be represented by the formula $(RO)_3Si\ X$. In this formula, X represents a functional organic group such as chlorine, mercaptan, amines or diamines, epoxy, vinyl, or methacrylate. These reactive organic groups are attached through a stable carbon linkage, usually a $-(CH_2)_3-$ group, to the silicon. At the silicon or inorganic end of the molecule are hydrolyzable alkoxy or acetoxy groups (RO). These methoxy or acetoxy groups on silicon undergo rapid hydrolysis in aqueous solutions, or upon exposure to moist air to form the reactive $\equiv SiOH$ (silanol) functionality. Thus, two quite different chemically reactive groups are at opposite ends of the same silane coupling agent molecule.

The amount of silane coupling agent employed varies from 0.1 phr to about 10 phr, preferably about 0.5 to about 2.5 phr. When the amount of silane coupling agent is between about 0.25 and about 2.5 phr, the sealant retains its translucency and clarity.

The compositions of this invention may be modified with supplementary materials including pigments, fillers and the like as well as stabilizers and oxidation/uv stabilizers.

For some applications it may be desirable to apply the sealant as a hot melt. In that situation, no additional solvents or carriers are required. However, in other situations it is desirable to employ the sealants at ambient temperatures. In that case additional solvents or carriers are added. Suitable carrier materials include organic solvents such as hexanes, naphthas, and toluene, ester solvents such as ethyl acetate and propyl acetate and ketone solvents such as methyl ethyl ketone and methyl isobutyl ketone. The amount of carrier added varies from 0 to about 400 phr, preferably about 0 to about 200 phr.

The invention is further illustrated by means of the following illustrative embodiments, which are given for the purpose of illustration only and are not meant to limit the invention to the particular components and amounts disclosed.

ILLUSTRATIVE EMBODIMENT I

In Illustrative Embodiment I, two commercial transparent sealants are compared with an experimental sealant based on Shell Kraton ® G 1652 Rubber (not according to the invention) and based on Shell Kraton ® DE 1657 Rubber (according to the invention). The Kraton DE 1657 Rubber is a selectively hydrogenated SEBS/SEB block copolymer having block molecular weights and styrene content within the range claimed herein. The Kraton G 1652 Rubber (SEBS block copolymer) has block molecular weights and percent styrene outside (higher than) those claimed in the present invention.

Other components include a mid block tackifying resin, plasticizer, a silane coupling agent, a naphtha/propyl acetate carrier, and a standard antioxidant/uv inhibitor package. The fomulation is presented below in Table I:

TABLE 1

| Ingredient | Composition of Solids, parts by weight | Composition of Sealant, parts by weight |
|---|---|---|
| Block copolymer | 100 | 100 |
| Tackifying resin | 207 | 207 |
| Plasticizers | 22 | 22 |
| Silane | 2.5 | 2.5 |
| AO, UV additives | 2.5 | 2.5 |
| Naphtha | — | 97 |
| Propyl acetate | — | 32 |

The various results are presented below in Table II:

TABLE II

PERFORMANCE COMPARISON OF CLEAR SEALANTS

|  | Commercial Sealant A | Commercial Sealant B | Experimental Sealant A[a] | Experimental Sealant B[a] |
|---|---|---|---|---|
| Base Polymer Type | Silicone | Unknown | KRATON ® G 1652 Rubber | KRATON DE 1657 Rubber |
| Hardness[b], Shore A |  |  |  |  |
| Instantaneous | 37 | 29 | 49 | — |
| 10 second | 35 | 15 | 20 | — |
| 180° Peel Adhesion Before Water Immersion[b] |  |  |  |  |
| Peel Strength on Glass, kN/m (pli) | 1.4 (8) | 3.0 (17) | 2.1 (12) | 4.0 (23) |
| Failure Mechanism | Cohesive | Cohesive | Adhesive | Cohesive |
| 180° Peel Adhesion After 1 Week in Water[b] |  |  |  |  |
| Peel Strength on Glass, kN/m (pli) | 1,4 (8) | 0.2 (1) | 2.1 (12) | 4.4 (25) |
| Failure Mechanism | Cohesive | Adhesive | Adhesive | Cohesive |
| Durability Cyclic Testing[b] |  |  |  |  |
| Appearance After 1 Week @ 70° C. | Excellent | Good | Good | — |
| Appearance After 10 Cycles at 25° C. | Excellent | Good | Failure | — |
| Solids Content, % w | 100 | 94 | 72 | 72 |
| Shrinkage[c] | None | Little | Moderate | Moderate |
| Color After 2000 Hours UV Exposure[d] | Colorless | Yellow | Pale Yellow | — |
| Resilience and Elasticity[e] | Excellent | Poor | Good | Good |
| Clarity | Turbid | Very Turbid | Transparent | Transparent |
| Paint Adhesion[f] | Very Poor | Good | Good | — |

[a]See Table 1 for Sealant formulation.
[b]Properties measured according to Federal Spec TTS-001543A.
[c]Qualitative rating of shrinkage which occurred in durability cyclic test sample during cure.
[d]Appearance of 0.8mm thick film of sealant after exposure in Xenon lamp weatherometer at 45° C. and 40% relative humidity.
[e]Qualitative rating during 60° flex of durability cyclic test sample.
[f]Qualitative assessment of ease with which paint could be removed from sealant by rubbing with finger.

What is claimed is:

1. A sealant composition possessing excellent oxidative and UV stability along with improved tack, reduced melt viscosity, and a cohesive failure mechanism in the 180° peel test comprises:
   (a) 100 parts by weight of a selectively hydrogenated block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A' and A blocks are between about 3,000 and about 7,000, and the monoalkenyl arene content of the multiblock copolymer is between about 7% and about 22% by weight, wherein the weight ratio between the A' B' block copolymer and the multiblock copolymer is 20:80 to about 60:40;
   about 50 to about 350 parts by weight of a tackifying resin compatible with block B;
   (c) about 0 to about 100 parts by weight of a plasticizer; and
   (d) about 0.1 to about 10 parts by weight of a silane coupling agent.

2. A composition according to claim 1 wherein said monoalkenyl arene is styrene and said conjugated diene is butadiene.

3. A composition according to claim 1 wherein said multiblock copolymer is a selectively hydrogenated linear polystyrene-polybutadiene-polystyrene block copolymer.

4. A composition according to claim 3 wherein said A'B' block copolymer is a selectively hydrogenated polystyrene-polybutadiene block copolymer.

5. A composition according to claim 3 wherein said A'B' block copolymer is a selectively hydrogenated polystyrene-polyisoprene block copolymer.

6. A composition according to claim 1 wherein said multiblock copolymer is a selectively hydrogenated polystyrene-polyisoprene-polystyrene block copolymer.

7. A composition according to claim 2 wherein said butadiene block has a 1,2 configuration of between about 35 and 65 mol percent.

8. A translucent composition according to claim 1 wherein the amount of silane coupling agent is between about 0.25 parts by weight and about 2.5 parts by weight.

* * * * *